United States Patent
Hong et al.

(10) Patent No.: US 10,359,512 B1
(45) Date of Patent: Jul. 23, 2019

(54) SYSTEMS AND METHODS FOR STEREO RADAR TRACKING

(71) Applicant: Oculii Corp., Beavercreek, OH (US)

(72) Inventors: Lang Hong, Beavercreek, OH (US); Steven Hong, Beavercreek, OH (US)

(73) Assignee: Oculii Corp., Beavercreek, OH (US)

(*) Notice: Subject to any disclaimer, the term of this patent is extended or adjusted under 35 U.S.C. 154(b) by 0 days.

(21) Appl. No.: 16/149,369

(22) Filed: Oct. 2, 2018

(51) Int. Cl.
  *G01S 3/48* (2006.01)
  *G01S 13/42* (2006.01)
  *G01S 13/44* (2006.01)
  *G01S 13/58* (2006.01)
  *G01S 13/87* (2006.01)
  *G01S 13/72* (2006.01)
  *G01S 13/91* (2006.01)

(52) U.S. Cl.
  CPC ............ *G01S 13/87* (2013.01); *G01S 3/48* (2013.01); *G01S 13/42* (2013.01); *G01S 13/4454* (2013.01); *G01S 13/584* (2013.01); *G01S 13/726* (2013.01); *G01S 13/91* (2013.01)

(58) Field of Classification Search
  CPC ......... G01S 13/584; G01S 3/48; G01S 13/42; G01S 13/4454; G01S 13/87; G01S 13/726
  USPC .................................................. 342/131, 59
  See application file for complete search history.

(56) References Cited

U.S. PATENT DOCUMENTS

| | | | |
|---|---|---|---|
| 4,727,373 A | * | 2/1988 | Hoover ............... G01S 13/9035 244/167 |
| 5,955,983 A | * | 9/1999 | Li ........................... G01S 7/288 342/107 |
| 9,869,762 B1 | | 1/2018 | Alland et al. |
| 2007/0013575 A1 | | 1/2007 | Lee et al. |
| 2008/0291077 A1 | | 11/2008 | Chang |
| 2009/0201206 A1 | | 8/2009 | Li et al. |
| 2010/0019954 A1 | | 1/2010 | Mizutani et al. |
| 2010/0328157 A1 | | 12/2010 | Culkin et al. |
| 2012/0001791 A1 | | 1/2012 | Wintermantel |
| 2012/0299773 A1 | | 11/2012 | Stirling-Gallacher et al. |
| 2016/0033632 A1 | | 2/2016 | Searcy et al. |
| 2017/0082730 A1 | | 3/2017 | Kishigami et al. |
| 2017/0205505 A1 | * | 7/2017 | Heumphreus .......... G01S 13/87 |
| 2017/0212213 A1 | | 7/2017 | Kishigami |
| 2018/0024235 A1 | * | 1/2018 | Hong ....................... G01S 3/48 342/59 |
| 2018/0156891 A1 | | 6/2018 | Brune et al. |
| 2018/0166794 A1 | | 6/2018 | Raphaeli et al. |

FOREIGN PATENT DOCUMENTS

WO   WO2017/096538   *   6/2017

* cited by examiner

*Primary Examiner* — Frank J McGue

(74) *Attorney, Agent, or Firm* — Jeffrey Schox; Thomas Gwinn

(57) ABSTRACT

A method for coherent stereo radar tracking includes, at a stereo radar system, transmitting a probe signal, receiving a reflected probe signal in response to reflection of the probe signal by a tracking target, calculating first and second target ranges from the reflected probe signal data, transforming the reflected probe signal data based on the first and second target ranges, and calculating a first target angle from the transformed reflected probe signal data.

25 Claims, 13 Drawing Sheets

120 element set 1              element set 2 d    d d    d intra-set        inter-set        intra-set
spacing          spacing          spacing

200

```
┌─────────────────────────────────────────────────────────┐
│         Transmitting probe signal S210                  │
└─────────────────────────────────────────────────────────┘
┌─────────────────────────────────────────────────────────┐
│         Receiving reflected probe signal S220           │
└─────────────────────────────────────────────────────────┘
┌─────────────────────────────────────────────────────────┐
│      Calculating initial tracking parameters S230       │
│  ┌───────────────────────────────────────────────────┐  │
│  │       Calculating first set of ranges S231        │  │
│  └───────────────────────────────────────────────────┘  │
│  ┌───────────────────────────────────────────────────┐  │
│  │      Transforming received signal data S232       │  │
│  └───────────────────────────────────────────────────┘  │
│  ┌───────────────────────────────────────────────────┐  │
│  │        Calculating target angle(s) S233           │  │
│  └───────────────────────────────────────────────────┘  │
└─────────────────────────────────────────────────────────┘
┌─────────────────────────────────────────────────────────┐
│        Refining initial tracking parameters S240        │
└─────────────────────────────────────────────────────────┘
```

FIGURE 7

Angle (Array 1)　　　　　Angle (Array 2)

Angle (Element sets 1 and 2 jointly)

SYSTEMS AND METHODS FOR STEREO RADAR TRACKING

TECHNICAL FIELD

This invention relates generally to the radar field, and more specifically to new and useful systems and methods for stereo radar tracking.

BACKGROUND

Traditional array-based receivers calculate azimuth and/or elevation by measuring the time or phase difference between received probe signals at different receivers (or antennas) within the array(s), as shown in FIG. 1 (1D array), using beamforming (e.g., digital beamforming). Similar effects may be produced using a transmit array instead of a receiver array. These traditional solutions are limited: angular resolution depends both on the number of elements in the array and the angle between the array and the target:

$$\theta_{resolution} \approx \frac{\lambda}{Nd\cos\theta}$$

where N is the number of elements in the array and d is the distance separating them.

Thus, there is a need in the radar field to create new and useful systems and methods for stereo radar tracking. This invention provides such new and useful systems and methods.

BRIEF DESCRIPTION OF THE FIGURES

FIG. 7 is a chart view of a method of an invention embodiment;

DESCRIPTION OF THE INVENTION EMBODIMENTS

The following description of the invention embodiments of the invention is not intended to limit the invention to these invention embodiments, but rather to enable any person skilled in the art to make and use this invention.

1. Angular Resolution in Uniformly Spaced Linear Arrays (USLA)

As discussed in the background section, traditional array-based radar systems (also referred to as uniformly spaced linear arrays or ULSA) are limited: angular resolution depends both on the number of elements in the array and the angle between the array and the target:

$$\theta_{resolution} \approx \frac{\lambda}{Nd\cos\theta}$$

where N is the number of elements in the array and d is the distance separating them.

Figure 1:
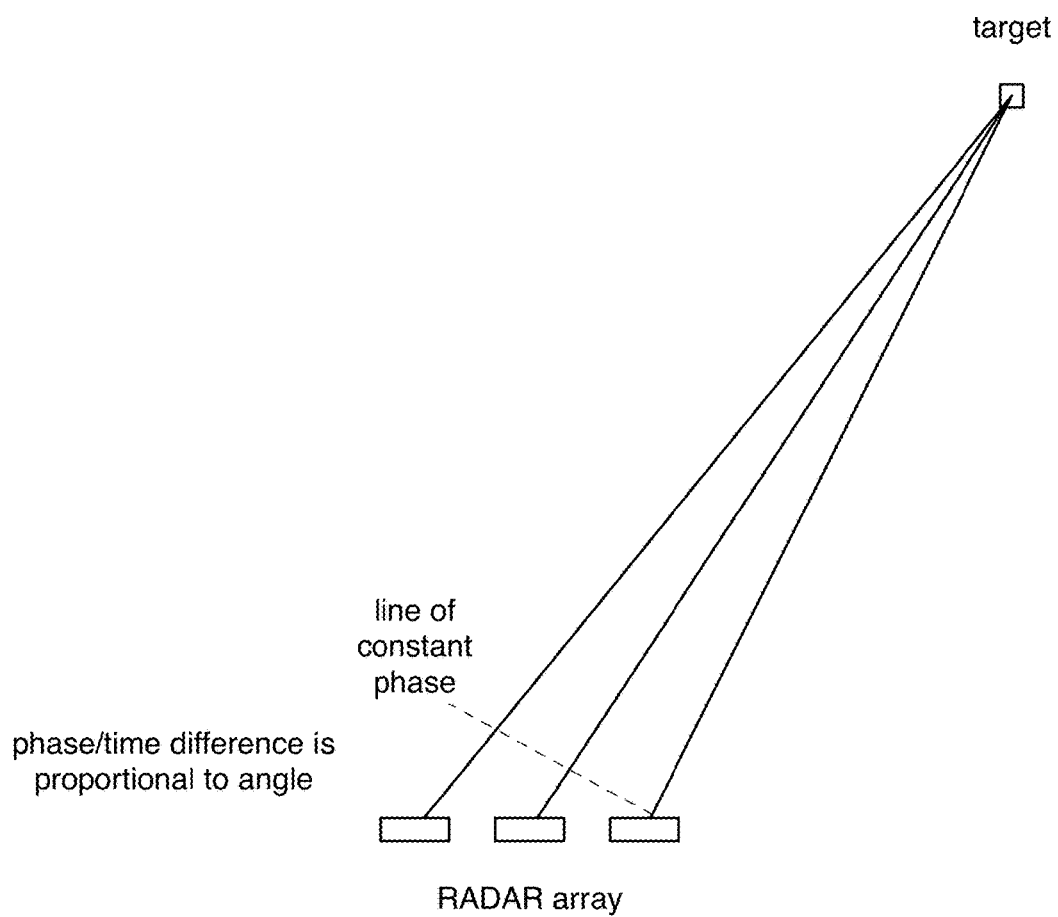
FIG. 1 is a prior art example diagram of a 1D receiver array radar system.
Figure 2:
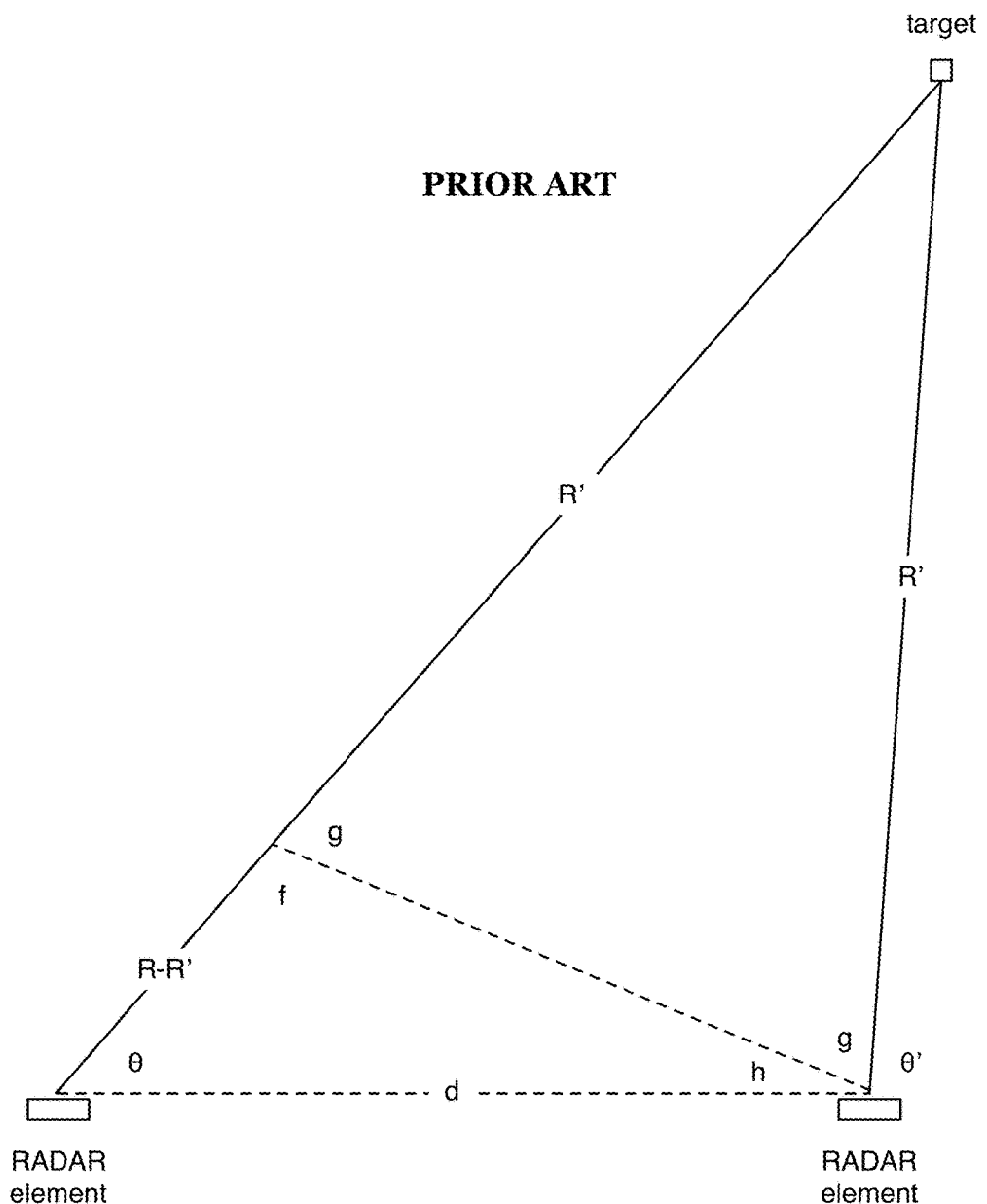
FIG. 2 is a prior art example diagram of a 1D receiver array radar system.

Such radar systems operate by comparing the phase/time difference of signal received at different elements of the array. For example, the angles and ranges for two elements of a linear array are as shown in FIG. 2. The range R can be determined by the time difference between signal transmission and arrival. By measuring the difference in phase/time between signals received at the first and second elements, the difference in range R−R' can be related to θ using the law of sines:

$$\frac{R - R'}{\sin h} = \frac{d}{\sin f}$$

Which can be rewritten as:

$$\frac{R - R'}{\cos\frac{3\theta - \theta'}{2}} = \frac{d}{\cos\frac{\theta - \theta'}{2}}$$

Note that this equation includes both θ and θ', and given that the relationship between these angles is unknown, it is not possible to find θ from this equation. However, when R is much larger than d, the difference in angle becomes small, and so traditional linear arrays use a far-field approximation (θ=θ') to simplify the equation:

$$R-R'=d\cos\theta$$

Stated alternatively, it is assumed that the angle between each element of the array and the target is the same. Notably, as d increases relative to R, this approximation becomes less accurate. Also, note that this effect means that as additional elements are added on the end of an array (e.g., moving from an array with 10 elements spaced by d to an array with 110 elements spaced by d), there is a diminishing return in resolution increase (because, for elements farther from the angle reference, the far-field approximation is less accurate).

2. System for Stereo Radar Tracking

Figure 3A:
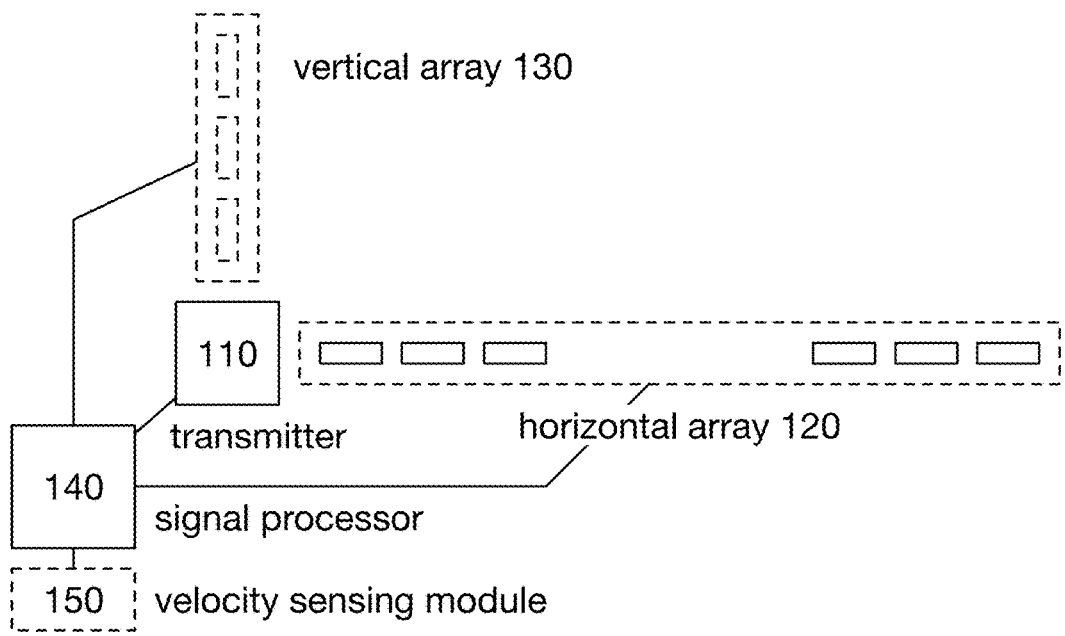
FIG. 3A is diagram view of a system of an invention embodiment.
Figure 3B:
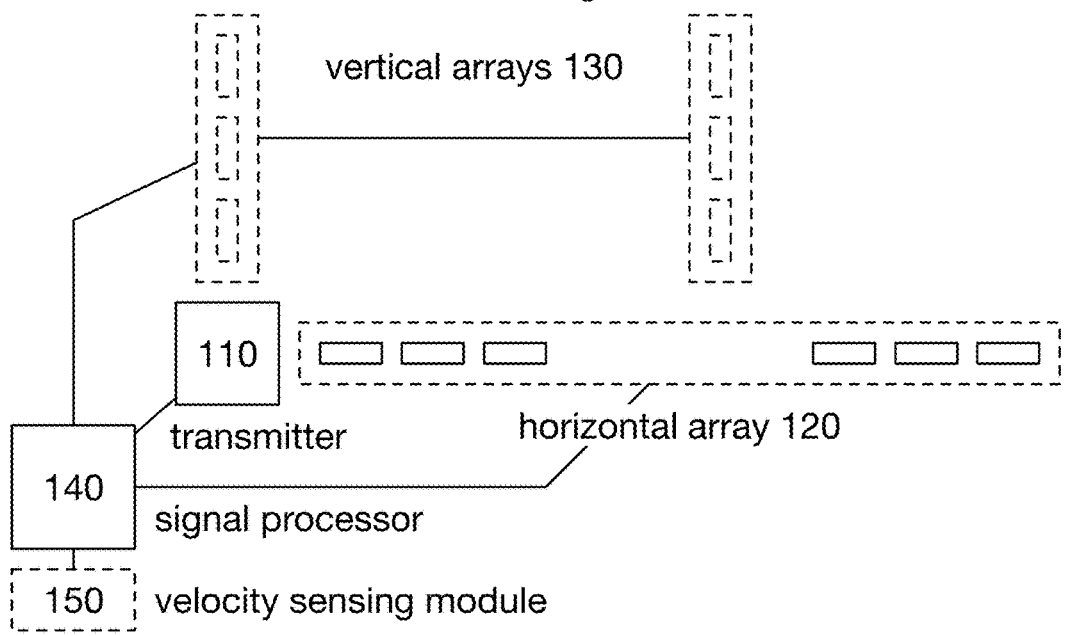
FIG. 3B is diagram view of a system of an invention embodiment.
Figure 3C:
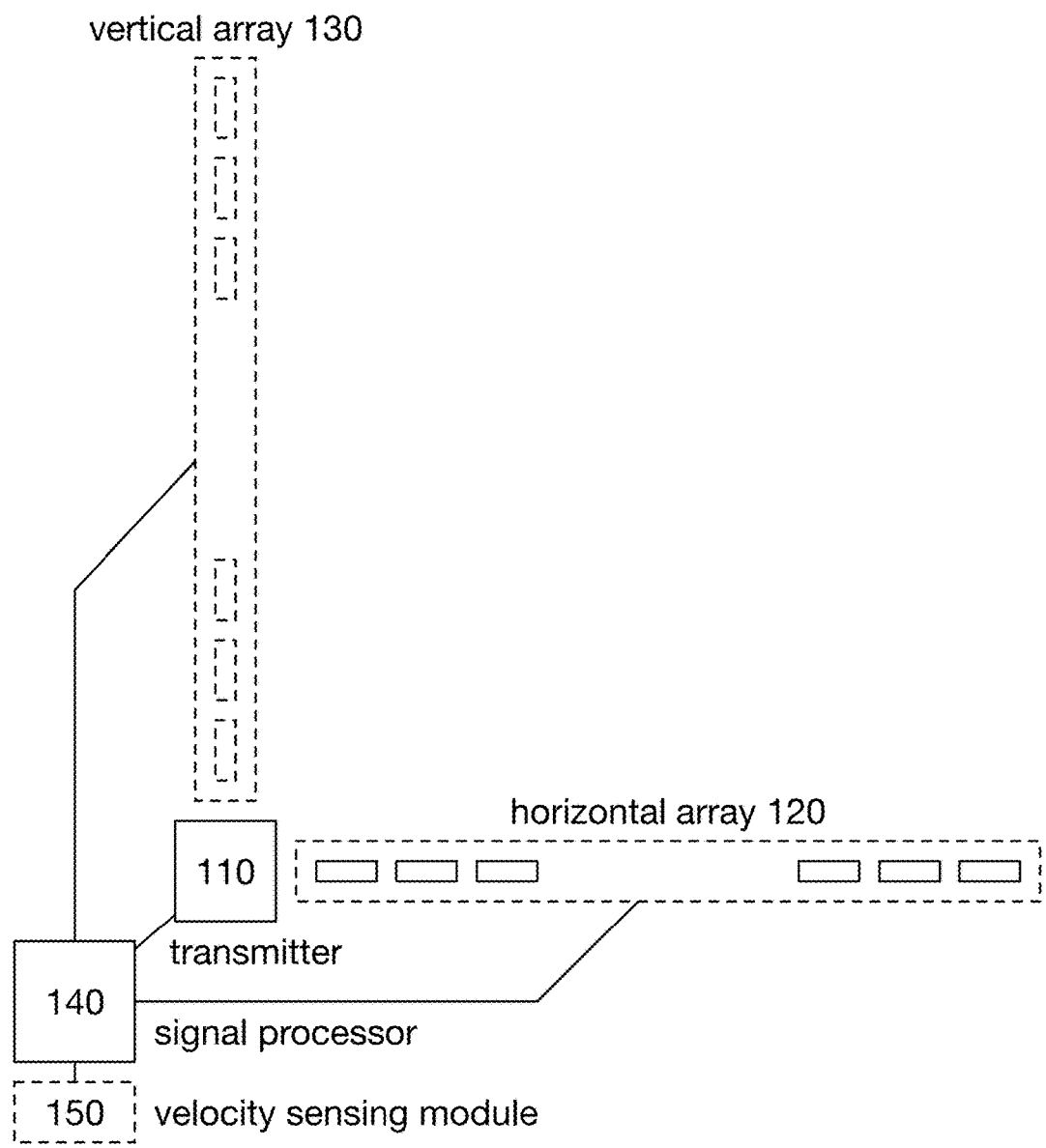
FIG. 3C is diagram view of a system of an invention embodiment.

A system 100 for stereo radar tracking includes a transmitter 110, a horizontal stereo receiver array 120, and a signal processor 140, as shown in FIGS. 3A, 3B, and 3C.

The system 100 may additionally include a vertical receiver array 130 and/or a velocity sensing module 150.

As discussed in the first section, traditional array-based radar systems (also referred to as uniformly spaced linear arrays or ULSA) are limited in angular resolution and, as the size of the array increases (without changing array spacing), suffer from diminishing marginal returns in performance.

The system 100 represents a novel system for radar tracking that provides for enhanced performance over traditional radar arrays. The system 100 is a stereo radar tracking system: as the term is used throughout the present application, a stereo radar tracking system is one that fulfills three criteria: 1) at least one receiver or transmitter of the system is a radar array, 2) the radar array includes two or more sets of elements, where each set of elements has an intra-set spacing and an inter-set spacing larger than the intra-set spacing, and 3) the radar array calculates position data using different far-field assumptions for each element set. This third criterion is what distinguishes stereo radar transceivers from standard arrays with similar physical configurations.

Figure 4A:
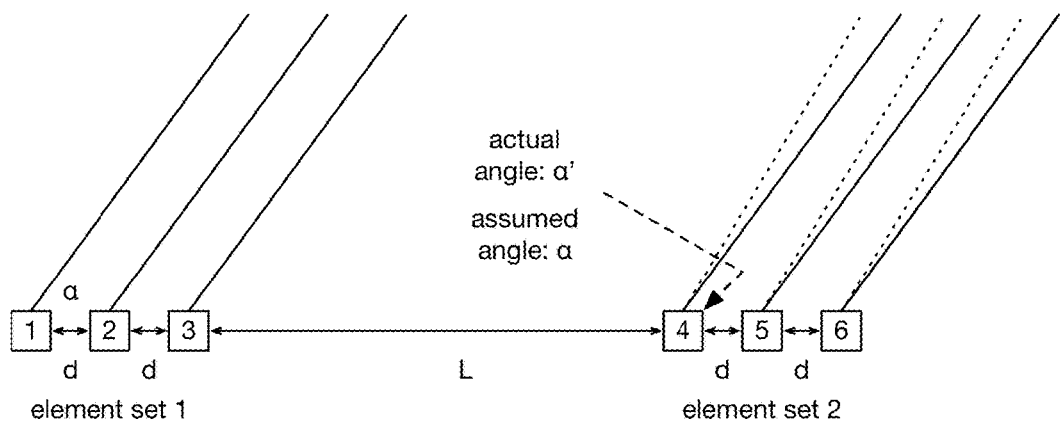
FIG. 4A is an example of a signal reception by a non-stereo receiver array.

For example, as shown in FIG. 4A, a traditional radar receiver array may detect angle information of a target by assuming that all elements of the array are at the same angle relative to the target. Based on the difference in time and/or phase between signals at each element, the angle between the target and the array may be determined. For radar arrays where the distance between the array and the target (R) is very large compared to the size of the array, this works fine. But as the size of the radar array is increased, this assumption breaks down. Note that as shown in FIG. 4A, for elements 1, 2, and 3, the actual vector to target and the assumed vector (the vector produced by assuming constant angle) are very close, but for elements 4, 5, and 6 there is noticeable difference between the actual vector and the assumed vector.

Figure 4B:
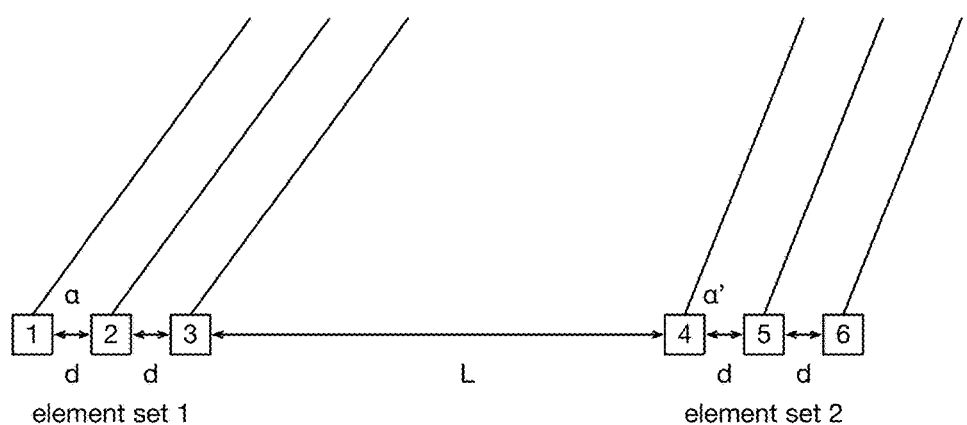
FIG. 4B is an example of a signal reception by a stereo receiver array.

In contrast, the stereo array as shown in FIG. 4B only assumes similar angle to target among elements of a set; the elements of set 1 and set 2 may have different angles to target. However, unlike independent radar receivers, the spatial relationship between the element sets may be precisely known (e.g., separated by 1 on the array axis), allowing data to be jointly processed or otherwise matched between elements.

Further, note that non-uniformly spaced linear arrays (NUSLA) are typically designed to enhance the quality factor of a radar system's main lobe (making the responsiveness of the system highly directional and confined to a small angle range)

The system 100 can be configured to operate in coherent (where signals received at different element sets are processed jointly) and/or non-coherent (where signals received at different element sets are processed independently and data produced by different element sets is matched at a later time) modes (or a semi-coherent mode that is some combination of the two). The result is a powerful and configurable system with some of the advantages afforded to large traditional radar arrays without the high cost and complexity required to implement such arrays.

Further, the flexible nature of the system 100 may enable it to be used with Doppler enhancement techniques to achieve even higher performance. Recently, radar tracking systems have been proposed (see U.S. patent application Ser. No. 15/676,018, filed 14 Aug. 2017, the entirety of which is incorporated by this reference) that utilize Doppler frequency shift data in addition to traditional data sources (e.g., relative phase to determine elevation/azimuth angle) to provide enhanced accuracy. Frequency shifts due to the Doppler effect are frequently used by radar systems to provide an estimate of relative velocity between radar and target; however, on its own, Doppler data can only provide information about the rate of change of range dR/dt. This is fine for applications like traffic control, where radar guns are aligned directly with the direction of travel of targets (e.g., the angle between the line segment connecting target and radar gun and the direction of relative velocity between the target and radar gun is close to zero); however, at non-negligible angles there is a significant difference between dR/dt and the actual relative velocity.

While this fact is detrimental for many radar systems, Doppler-enhanced radar tracking systems take advantage of this discrepancy in cases where the relative velocity between radar and target is known. In such situations, the composite angle between the radar and the target can be derived. One particular situation involves tracking stationary targets in a moving vehicle with a known velocity. This composite angle can then be used to aid in deriving a tracking solution for the target, thus providing improved angular resolution over traditional systems.

The transmitter 110 functions to transmit a signal that, after reflection by a target, can provide information about the target (e.g., relative location, velocity, etc.). The transmitter 110 preferably transmits a frequency shift keyed (FSK) RADAR signal or a frequency-modulated continuous wave (FMCW) RADAR signal, but the transmitter 110 may transmit any signal satisfying these constraints; e.g., an electromagnetic signal (as in radio waves in RADAR, infrared/visible/UV waves in LIDAR), a sound signal (as in SONAR).

The transmitter 110 preferably has a single transmitting element (e.g., a single transmit antenna), but may additionally or alternatively have multiple transmitting elements (e.g., as in a radar array). If the transmitter 110 has multiple elements, these elements may include a single transmitter paired to multiple antennas (e.g., spaced in a particular pattern and/or with antennas coupled to phase/time delays); multiple transmitters, each paired to a single antenna; multiple transmitters paired to multiple antennas, or any other configuration.

The system 100 may include any number of transmitters 110 or transmitting elements. For example, the system 100 may include two transmitting elements (or two transmitters 110) that transmit signals having different polarizations.

The horizontal stereo receiver array 120 functions to receive data resulting from the reflection of the probe signal(s) transmitted by the transmitter 110. The horizontal stereo receiver array 120 preferably measures phase, magnitude, and frequency information from reflected probe signals, but the horizontal stereo receiver array 120 may additionally or alternatively measure any available characteristics of the reflected probe signals.

Figure 5A:
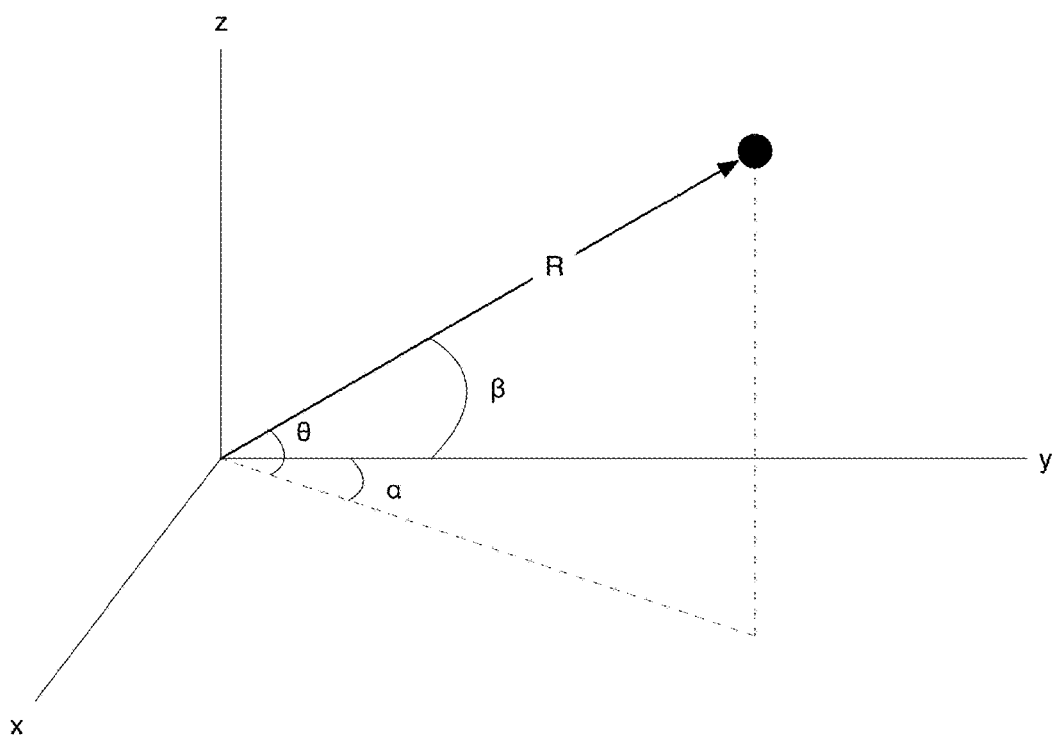
FIG. 5A is an example view of a tracking target in a spherical coordinate system.
Figure 5B:
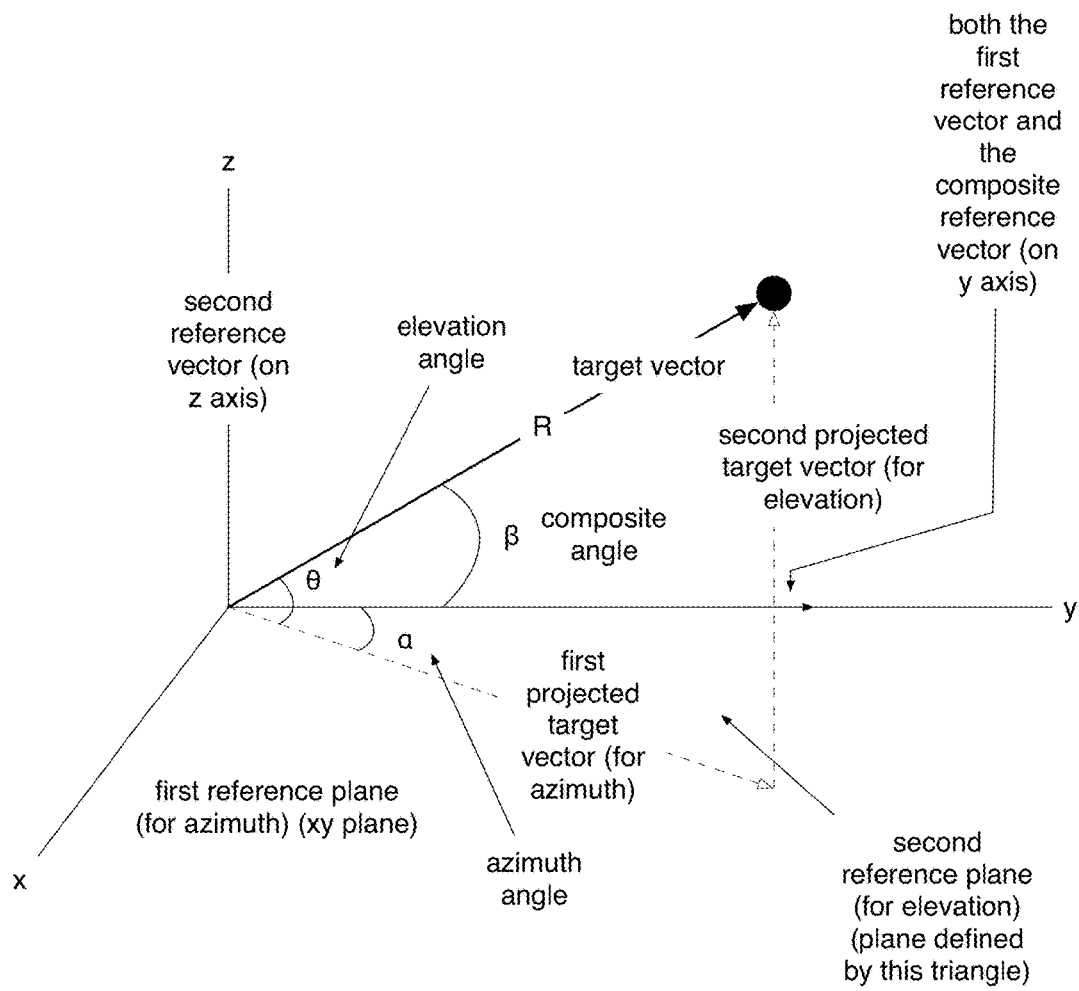
FIG. 5B is an example view of a tracking target in a spherical coordinate system.

From data received from the horizontal stereo receiver array 120, tracking parameters relating to a tracking target may be calculated. The horizontal stereo receiver array 120 is preferably used to determine azimuth ($\alpha$), as shown in FIGS. 5A and 5B, but parameters used to establish target position may be defined in any coordinate system and base, and the horizontal stereo receiver array 120 may be used to determine any relevant tracking parameters. In the present application, target position is preferably represented in a Cartesian coordinate system with the origin at the radar (e.g., x,y,z represents target position) or a spherical coordinate system with the same origin, wherein position is defined by range (R), azimuth ($\alpha$), and elevation ($\theta$); alternatively, target position may be described in any manner. Note that elevation (and similarly azimuth) is an example of an angle between a reference vector and a projected target vector; the projected target vector is the vector between the observer (e.g., the radar) and the target, projected into a reference plane (the reference plane containing the reference vector). The system 100 may calculate any such angles.

Figure 6:
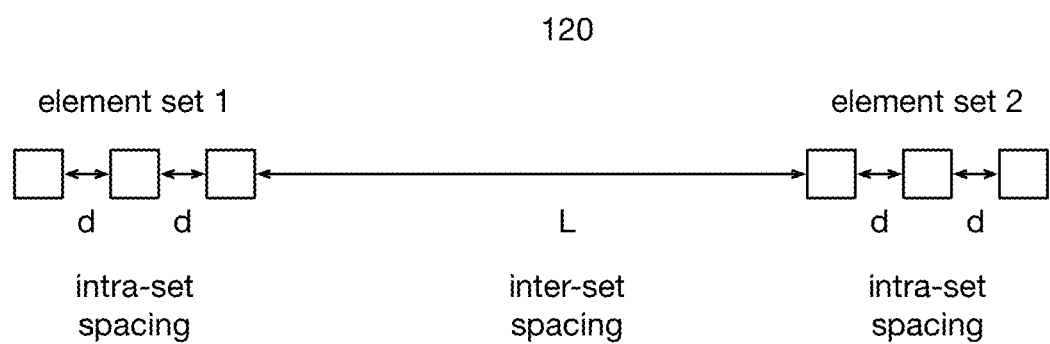
FIG. 6 is a diagram view of a stereo radar array of a system of an invention embodiment.

As shown in FIG. 6, the horizontal stereo receiver array 120 includes at least two sets of receiver elements arranged in a pattern; e.g., along a horizontal axis. Each set of receiver elements may include a single receiver paired to multiple antennas (e.g., spaced in a particular pattern and/or with antennas coupled to phase/time delays); multiple receivers, each paired to a single antenna; multiple receivers paired to multiple antennas, or any other configuration.

As shown in FIG. 6, elements of an element set of the horizontal stereo receiver array 120 preferably have a uniform intra-set spacing and the element sets themselves are preferably separated by inter-set spacings larger than the intra-set spacing. Alternatively, elements within sets may be positioned or located in any way, and element sets may further be positioned or located in any way.

The horizontal stereo receiver array 120 preferably is used to calculate angles from phase information, but may additionally or alternatively be used to calculate angles in any manner (e.g., using horizontal component of Doppler frequency shift).

The vertical receiver array 130 is preferably substantially similar to the horizontal receiver array 120, except that the vertical receiver array is arranged upon an axis not parallel to the axis of the horizontal receiver array (e.g., a vertical axis). The vertical receiver array 130 is preferably used to calculate elevation, but may additionally or alternatively be used to calculate any tracking parameters.

Note that while at least one of the receiver arrays 120/130 are stereo, additional receiver arrays may or may not be stereo. For example, as shown in FIG. 3A, the vertical array 130 is a non-stereo array. As shown in FIG. 3B, the system 100 includes two non-stereo vertical arrays 130. As shown in FIG. 3C, the system 100 includes a stereo vertical array 130. Further note that while the present application provides examples of a stereo horizontal array 120 along with various configurations of vertical arrays 130 (some stereo, some not), it is understood that the system may also be configured in the inverse (i.e., the vertical array 130 is stereo, but the horizontal array 120 may not be).

As shown in FIG. 3B, in some cases, if the system 100 includes multiple vertical arrays 130, the arrays 130 may be positioned based on element set positions of the horizontal array 120. For example, if a first vertical array 130 is positioned 5 cm left and 5 cm above some reference point of a first element set of the horizontal array 120, the second vertical array 130 may be positioned 5 cm left and 5 cm above the same reference point in the second element set.

The signal processor 140 functions to calculate tracking parameters from data collected by the horizontal receiver array 120, the vertical receiver array 130, and/or the velocity sensing module 150. The signal processor 140 preferably includes a microprocessor or microcontroller that calculates tracking parameters according to the method 200; additionally or alternatively, the signal processor 140 may calculate tracking parameters in any manner. The signal processor 140 may additionally or alternatively be used to communicate with an external computer (e.g., to offload computations, receive additional data, or for other reason). The signal processor 140 may also control configuration of the components of the system 100 or any calculations or actions performed by the system 100.

The velocity sensing module 150 functions to determine the velocity of the system 100 (or components of the system 100, or an object coupled to the system 100). The velocity sensing module is preferably a communications interface that couples to an inertial measurement unit (IMU), but may additionally or alternatively be any communications interface (e.g., Wi-Fi, Ethernet, ODB-II) or sensor (accelerometer, wheel speed sensor, IMU) capable of determining a speed and/or velocity.

3. Method for Coherent Stereo Radar Tracking

A method 200 for coherent stereo radar tracking includes transmitting a probe signal S210, receiving a reflected probe signal S220, and calculating initial tracking parameters from the reflected probe signal S230, as shown in FIG. 7. The method 200 may additionally include refining the initial tracking parameters S240.

The method 200 is preferably implemented by a system for stereo radar tracking (e.g., the system 100), but may additionally or alternatively be implemented using any suitable object tracking system (e.g., SONAR, LIDAR) configured in a stereo format.

The method 200 is performed by a stereo radar tracking system operating in coherent mode; that is, a system in which data received by different element sets of a stereo receiver array is processed jointly at the signal level (as opposed to processed at a higher level, such as at a point cloud level).

S210 includes transmitting a probe signal. S210 functions to transmit a signal that, after reflection by a target, can provide information about the target (e.g., relative location, velocity, etc.). S210 preferably includes transmitting a frequency shift keyed (FSK) RADAR signal or a frequency-modified continuous wave (FMCW) RADAR signal, but S210 may include transmitting any signal satisfying these constraints; e.g., an electromagnetic signal (as in radio waves in RADAR, infrared/visible/UV waves in LIDAR), a sound signal (as in SONAR).

S220 includes receiving a reflected probe signal. S220 functions to receive data resulting from the reflection of the probe signal transmitted in S210. S220 preferably includes measuring phase, magnitude, and frequency information from reflected probe signals, but S220 may additionally or alternatively include measuring any available characteristics of the reflected probe signals.

S230 includes calculating initial tracking parameters from the reflected probe signal. S230 functions to calculate a set of tracking parameters that identify at least a position of the target relative to the radar receiver; additionally or alternatively, tracking parameters may include additional parameters relevant to object tracking (e.g., target velocity, target acceleration). Note that S230 may include calculating more tracking parameters for a given target than necessary to achieve a position solution; for example, as described later, while only range, azimuth angle, and elevation angle may be necessary to calculate object position, composite angle may also be calculated and used to refine and/or check azimuth/elevation angle calculations.

Further, while S230 primarily includes calculating tracking parameters from the reflected probe signal, S230 may additionally or alternatively calculate or otherwise receive parameters relevant to object tracking (e.g., radar egomotion velocity) that are not calculated using the probe signal.

Parameters used to establish target position may be defined in any coordinate system and base. In the present application, target position is preferably represented in a Cartesian coordinate system with the origin at the radar (e.g., x,y,z represents target position) or a spherical coordinate system with the same origin, wherein position is defined by range (R), azimuth (α), and elevation (θ); alternatively, target position may be described in any manner. Note that elevation (and similarly azimuth) is an example of an angle between a reference vector and a projected target vector; the projected target vector is the vector between the observer (e.g., the radar) and the target, projected into a reference plane (the reference plane containing the reference vector). The method 200 may include calculating any such angles.

While, as previously mentioned, any parameters relevant to object tracking may be calculated in S230, some additional parameters that may be calculated include target range rate (d, typically calculated from Doppler data), relative target velocity (the velocity of the target with respect to the radar receiver), radar egomotion velocity (referred to in this application as egovelocity, the velocity of the radar receiver relative to a stationary position). These may be related; for example, range rate is equivalent to relative target velocity multiplied by the cosine of the looking angle between the radar and the target.

S230 may additionally or alternatively include calculating composite angle (β, the angle between the target and the radar: β=arccos[cos α×cos β], see also FIGS. 4A and 4B). While composite angle may be derived from elevation and azimuth (or vice versa), it may also be calculated from Doppler data. If, for example, elevation and azimuth are calculated from a first data source (e.g., phase differences between receivers in a receiver array) and composite angle is calculated from a second data source (e.g., Doppler frequency shift and relative velocity), composite angle can be used alongside elevation and azimuth to produce a more accurate solution.

S230 may include calculating tracking parameters from any suitable data source. For example, operating on a radar system with a horizontal receiver array, azimuth may be calculated based on phase differences between the reflected probe signal seen by each receiver in the array. Likewise, elevation may be calculated in a similar manner by a vertical receiver array (and/or elevation and azimuth may be calculated in similar manners by a two-dimensional receiver array). Range, for example, may be calculated based on travel time of a probe signal. Range rate, for example, may be calculated instantaneously (e.g., using Doppler frequency shift data) or over time (e.g., by measuring change in range over time). Composite angle, as previously discussed, may be derived from elevation/azimuth or calculated explicitly from Doppler data:

$$f_D \approx Kv\cos\beta; \quad K = 2\frac{f_0}{c}.$$

S230 may additionally include calculating relative target velocity in any manner. For example, S230 may include determining that a target is stationary and calculating relative target velocity based on egovelocity (i.e., in this case, relative target velocity is egovelocity). A target may be determined as stationary in any manner; for example, by identifying the target visually as a stationary target (e.g., a stop sign may be identified by its appearance), by identifying the target by its radar cross-section as a stationary target (e.g., a stop sign or a road may be identified by shape or other features), by comparing Doppler data to other (e.g., phase) data (e.g., if the composite angle provided by Doppler data is substantially different from the composite angle derived from elevation and azimuth, that may be a moving target), by the size of the target, or in any other manner. Likewise, egovelocity may be determined in any manner (e.g., a GPS receiver or IMU coupled to the position of the radar receiver, external tracking systems, etc.). As another example, S230 may include receiving relative target velocity information based on external data; e.g., an estimate from a visual tracking system coupled to the position of the radar receiver. Relative target velocity information may even be provided by an external tracking system or the target itself (e.g., transmissions of IMU data from a target vehicle).

In a first implementation of the method 200, S230 may include calculating a first set of ranges for a stereo array S231, transforming received signal data based on the first set of ranges and the geometry of the stereo array S232, and calculating a first target angle from the transformed received signal data S233.

S231 functions to establish a first set of ranges from signal data received at the stereo array. While ranges may be calculated in any manner, in one implementation range calculation may include converting reflected signal data to the frequency domain using a Fast Fourier Transform (FFT) (or any other technique to convert time domain signals to frequency domain for analysis). S230 may also improve system performance by using a Sliding Fast Fourier transform (SFFT) or similar techniques such as the Sliding Discrete Fourier Transform (SDFT) and Short-time Fourier Transform (STFT) for this or other Fourier transforms. These techniques allow Fourier transforms for successive samples in a sample stream to be computed with substantially lower computational overhead, improving performance.

S231 preferably includes calculating range data for each element of the stereo array but may additionally or alternatively calculate range data for each element set or in any other manner. Range data may be calculated using the reflections of multiple probe signals, but may alternatively be calculated using the reflection of a single probe signal.

Figure 8A:
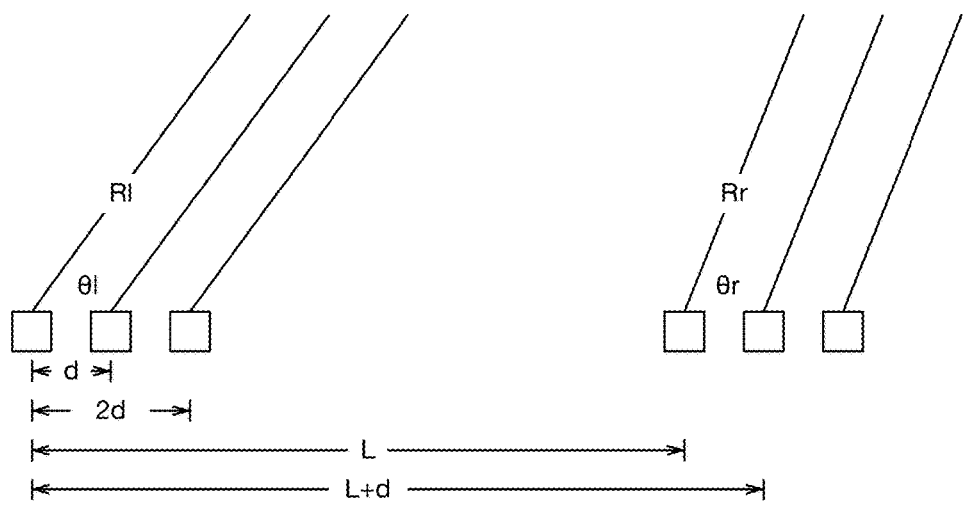
FIG. 8A is an example stereo radar array configuration.

S232 includes transforming received signal data based on the first set of ranges and the geometry of the stereo array. For example, consider an array as shown in FIG. 8A, which has two element sets, the left set indexed by i and the right set indexed by j. The range to a given target for the left set (referenced at the first element) may be written as $R_l$ and for the right side, $R_r$. Likewise, the angle to target for the left and right sets may be written as $\theta_l$ and $\theta_r$ respectively.

Traditionally, to find θ for a set of ranges, beamforming or an angle FFT might be performed on this set of data without any sort of transformation; that is, it would be assumed that the relationship between range difference for elements on the left side would be given by $$R_l - R_i = id \cos \theta_l$$

and the elements on the right side by $$R_l - R_j = (L + jd)\cos \theta_l$$

As is apparent from the formulae, this assumes that there is a single angle to target $\theta_l$. Another approach might be to consider these two separately as:

$$R_l - R_i = id \cos \theta_l$$

and $$R_r - R_j = jd \cos \theta_r$$

which avoids the approximation errors in the previous case, but in such a technique processing would be performed separately, requiring matching later.

In contrast, S232 involves including Or data implicitly as a function of geometry. In other words, the relationship for the left side may still be treated as:

$$R_l - R_i = id \cos \theta_l$$

but the relationship on the right side may be transformed as:

$$R_r - R_j = \frac{(L+jd)(R_l\cos\theta_l - L)}{R_r} = \frac{(L+jd)(R_l\cos\theta_l - L)}{\sqrt{R_l^2 + L^2 - 2R_lL\cos\theta_l}}$$

With this transformation, data from the left and right element sets may be processed jointly, leading to the calculation of $\theta_l$ (and $\theta_r$ does not need to be calculated explicitly, but if desired it can be recovered from $R_r$, $R_j$, $\theta_l$ and L) with higher accuracy than otherwise possible.

Figure 9A:
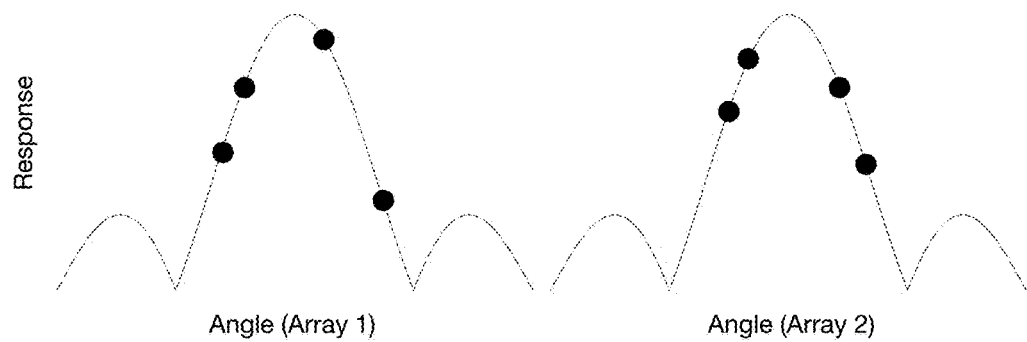
FIG. 9A is example antenna response curves for two antenna arrays processed independently.
Figure 9B:
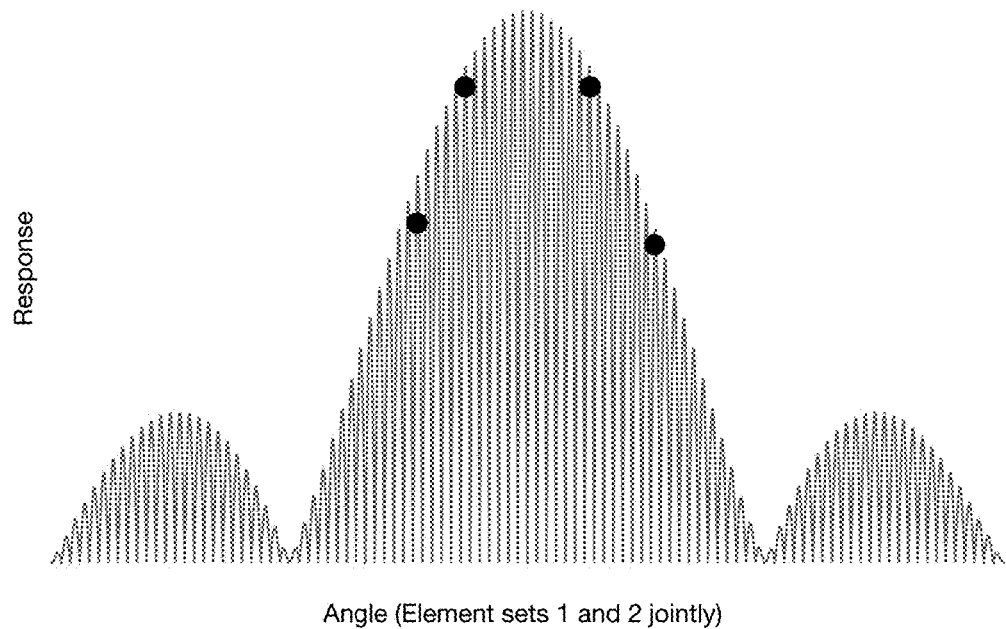
FIG. 9B is an example antenna response curve for a stereo antenna array processed jointly.

One enhancement to accuracy is as shown in FIGS. 9A and 9B. The antenna responses (vs. angle) for a two-array system with matching is as shown in FIG. 9A—note that points along these response curves vary slowly with angle (in comparison to as shown in FIG. 9B), which can make it difficult to perform matching across arrays. In contrast, the jointly processed curve varies rapidly with angle, providing higher accuracy angle determination (and, as previously discussed, with no matching required).

Note that while examples are given for two dimensional data they may be extended to three dimensions. For example, in 3D:

$$R_l - R_i = id\cos\theta_l\sin\alpha$$

$$R_r - R_j = \frac{(L+jd)(R_l\cos\theta_l\sin\alpha - L)}{\sqrt{R_l^2 + L^2 - 2R_lL\cos\theta_l\sin\alpha}}$$

Note that this transformation need not be a separate operation from the calculation of angle in S233. Further, note that while mathematical examples are given for a stereo array with uniform intra-set spacing and two element sets (separated by L), it is understood that these equations may be extended for any stereo array(s).

S232 may additionally include generating a lookup table pre-calculating values for $R_r$ and/or $\theta_r$ as a function of $R_l$ and $\theta_l$ or otherwise pre-calculating these values (such a table may be referred to as containing angle-range relationships).

Figure 8B:
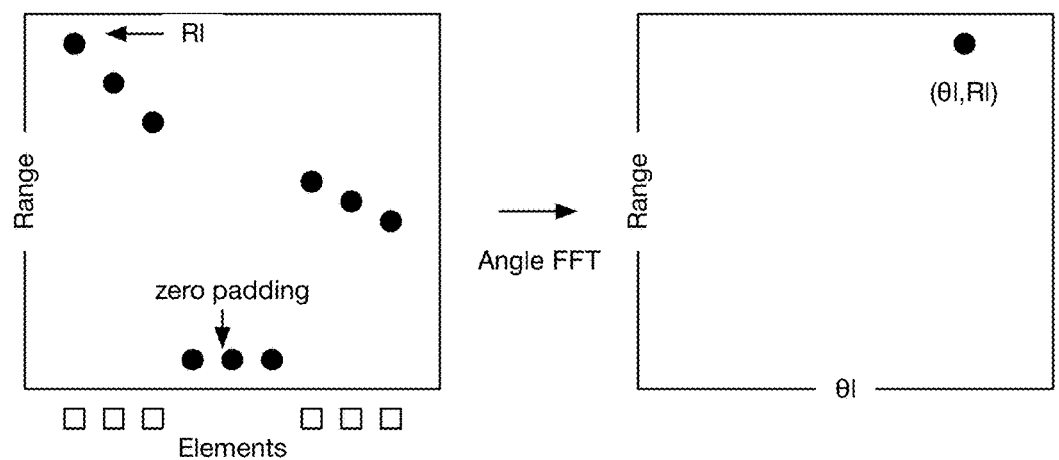
FIG. 8B is an example FFT input and output of the example stereo radar array configuration of FIG. 8A.

S233 functions to calculate a first target angle from the transformed received signal data. Traditionally, such angles are calculated by beamforming (e.g., modifying delays on received signal data from each element to maximize total power; the weights can then be used to determine the phase difference between elements and thus the angle). While S233 may include beamforming, S233 may additionally or alternatively include performing an angle FFT calculation across the set of range data (given the relationships described above). S233 preferably includes zero-padding between element sets, as shown in FIG. 8B, but may additionally alternatively not zero-pad (or zero-padding may be performed in any manner). Performing an Angle FFT without beamforming first may reduce computation time or resource use (or alternatively may result in better performance for the same computation time or resource use). Note that performing an Angle FFT without the aforementioned transformation in S232 is possible, but would result in considerable error in a stereo array with a large separation between element sets.

Note that while S231-S233 describe the process of calculating a single angle, a similar process may be performed for 3D data (two angles) by performing an FFT on the range/phase data for one axis and for the other simultaneously. As noted for the system 100, this is possible whether the second-axis array is a stereo array or not.

Doppler Enhancement

S231-S233 provide ways to calculate azimuth, elevation, or other angles from a single or multi-dimensional radar array using phase data. S230 may additionally or alternatively include using Doppler frequency shift data and velocity data to enhance position calculation. Using these two data sources, the composite angle may be calculated (without use of elevation or azimuth).

For a one-dimensional radar array, the composite angle may be used, along with the elevation and range, to produce a tracking solution. Note that this example implementation both expands the dimensionality of the radar array (producing three-dimensional data instead of two-dimensional data from the one-dimensional array), and also provides for increased accuracy over a traditional two-dimensional radar array (because the angular resolution of the Doppler-generated composite angle is often higher than the angular resolution of elevation and azimuth generated by traditional solutions).

In a second example implementation of the method 200, S230 includes calculating elevation and azimuth (though this angle may be any two perpendicular angles in a plane perpendicular to a receiver array) using phase or time difference information and calculating composite angle using Doppler frequency shift data and velocity data. This example implementation is preferably used with a two-dimensional radar array (which, using traditional techniques, is capable of determining both elevation and azimuth), but may additionally or alternatively be used with any radar system. In this example implementation, the composite angle may be used, along with the elevation, azimuth and range, to produce a tracking solution. In this example, the composite angle may be used as a constraint or filter to improve the accuracy of elevation and azimuth estimates, thus greatly improving the accuracy of the data produced.

While simply using Doppler-derived angles already provides substantial improvement to traditional techniques, S230 may include multiple techniques for providing additional improvement. Such techniques are as described in U.S. patent application Ser. No. 15/676,018.

S240 includes refining the initial tracking parameters. S240 functions to generate a more accurate tracking solution than that initially calculated by S230. In a first example implementation, S240 includes running a Kalman filter on Cartesian coordinates of a target generated from elevation angle or azimuth angle (determined from phase information), range, and composite angle (determined from Doppler shift), constrained by error bounds of the composite angle. In a second example implementation, S240 includes running a Kalman filter on Cartesian coordinates of a target generated from elevation angle and azimuth angle (determined from phase information), range, and composite angle (determined from Doppler shift), constrained by error bounds of the composite angle.

S240 may additionally or alternatively include filtering, refining, and/or constraining tracking parameters in any manner.

4. Method for Non-Coherent Stereo Radar Tracking

Figure 10:
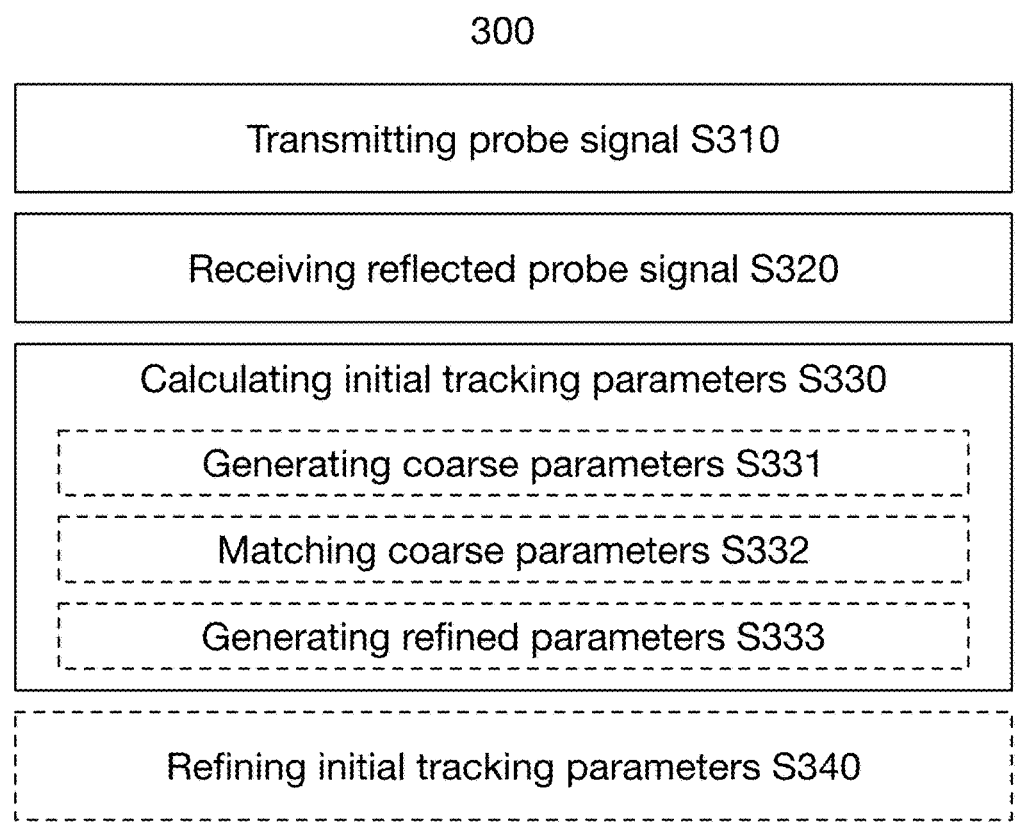
FIG. 10 is a chart view of a method of an invention embodiment.

A method 300 for non-coherent stereo radar tracking includes transmitting a probe signal S310, receiving a reflected probe signal S320, and calculating initial tracking parameters from the reflected probe signal S330, as shown in FIG. 10. The method 300 may additionally include refining the initial tracking parameters S340.

The method 300 is preferably implemented by a system for stereo radar tracking (e.g., the system 100), but may additionally or alternatively be implemented using any suitable object tracking system (e.g., SONAR, LIDAR) configured in a stereo format.

The method 300 is performed by a stereo radar tracking system operating in non-coherent mode; that is, a system in which data received by different element sets of a stereo receiver array are processed at higher level of abstraction than at the signal level (e.g., data received by each element set may be converted to location data independently before joint processing; data matching may occur at the point cloud level).

S310 includes transmitting a probe signal. S310 functions to transmit a signal that, after reflection by a target, can provide information about the target (e.g., relative location, velocity, etc.). S310 preferably includes transmitting a frequency shift keyed (FSK) RADAR signal or a frequency-modified continuous wave (FMCW) RADAR signal, but S310 may include transmitting any signal satisfying these constraints; e.g., an electromagnetic signal (as in radio waves in RADAR, infrared/visible/UV waves in LIDAR), a sound signal (as in SONAR).

S320 includes receiving a reflected probe signal. S320 functions to receive data resulting from the reflection of the probe signal transmitted in S310. S320 preferably includes measuring phase, magnitude, and frequency information from reflected probe signals, but S320 may additionally or alternatively include measuring any available characteristics of the reflected probe signals.

S330 includes calculating initial tracking parameters from the reflected probe signal. S330 functions to calculate a set of tracking parameters that identify at least a position of the target relative to the radar receiver; additionally or alternatively, tracking parameters may include additional parameters relevant to object tracking (e.g., target velocity, target acceleration). Note that S330 may include calculating more tracking parameters for a given target than necessary to achieve a position solution; for example, as described later, while only range, azimuth angle, and elevation angle may be necessary to calculate object position, composite angle may also be calculated and used to refine and/or check azimuth/elevation angle calculations.

Further, while S330 primarily includes calculating tracking parameters from the reflected probe signal, S330 may additionally or alternatively calculate or otherwise receive parameters relevant to object tracking (e.g., radar egomotion velocity) that are not calculated using the probe signal. As with the method 200, parameters used to establish target position may be defined in any coordinate system and base, and the method 300 may include calculating any angles or other parameters useful to establish target position.

As with S230, S330 may include calculating composite angle ($\beta$, the angle between the target and the radar: $\beta = \arccos[\cos \alpha \times \cos \beta]$, see also FIGS. 4A and 4B). While composite angle may be derived from elevation and azimuth (or vice versa), it may also be calculated from Doppler data.

As with S230, S330 may include calculating tracking parameters (including relative target velocity) from any suitable data source(s).

In one implementation of an invention embodiment, S330 includes generating sets of coarse tracking parameters for each element set of a stereo radar S331, matching coarse tracking parameters S332, and generating refined tracking parameters from the matched coarse tracking parameters S333.

S331 includes generating sets of coarse tracking parameters for each element set of a stereo radar. S331 preferably includes calculating range (R), range rate of change (dR/dt), and angle (e.g., $\theta$, $\alpha$, $\beta$), but may alternatively include calculating any set of tracking parameters. Range is preferably calculated from time-of-arrival, but may be calculated in any manner. Range rate is preferably calculated from Doppler data, but may be calculated in any manner. Initial angle is preferably calculated by an angle FFT applied to data from each element set, but may additionally or alternatively be calculated using beamforming or in any other manner (similarly to as described in the method 200).

S332 includes matching coarse tracking parameters. Based on the values of the coarse tracking parameters (and the time at which the data used to calculate those parameters was captured), data from different element sets of the stereo radar may be matched.

In one example, for a 1D radar with two element sets (e.g., as shown in FIG. 8A), S332 may include calculating $R_l$, $\theta_l$ and $R_r$, Or for one or more time periods and attempting to find pairings based on this data by looking for parameters within a given time period (e.g., $t_2 - t_1 < \epsilon_t$) where $|R_l - R_l^*| < \epsilon_r$ and $|\theta_l - \theta_l^*| < \epsilon_\theta$; where $R_l^*$, $\theta_l^*$, are transformed values calculated from $R_r$, $\theta_r$ given the geometry of the stereo array. For example, for the radar array of FIG. 8A, $$R_l^{*2} - 2R_l^* L\cos\theta_l^* = R_r^2 - L^2$$

$$\theta_l^* = \arcsin R_r \frac{\sin\theta_r}{R_l^*}$$

Figure 11:
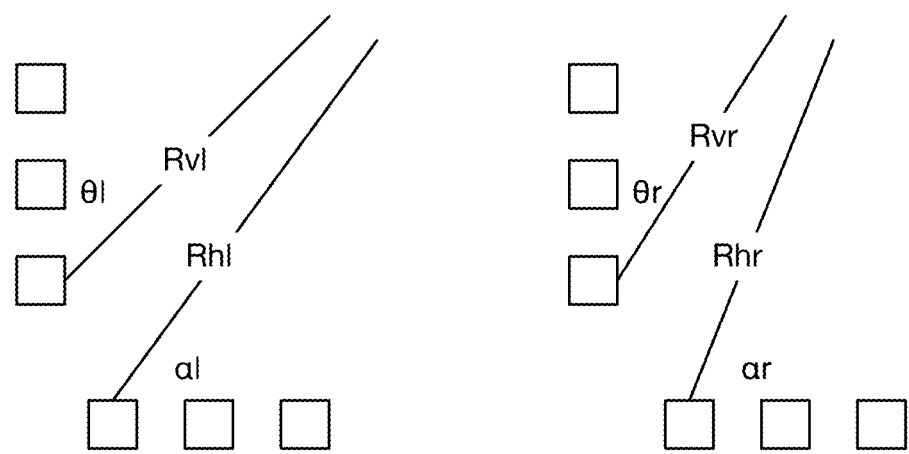
FIG. 11 is an example stereo radar array system configuration.

For a 2D radar with two element sets in the horizontal axis and two vertical radar arrays (e.g., as shown in FIG. 3B and FIG. 11), S332 may include matching horizontal and vertical parameter pairs and then matching across the array. For example, S231 may initially match points based on range and range rate between vertical and horizontal;

$$|R_{vl} - R_{hl}| < \epsilon_r, \left|\frac{d}{dt}R_{vl} - \frac{d}{dt}R_{hl}\right| < \epsilon_v$$

for a first element set on the horizontal array and a first vertical array, and $$|R_{vr} - R_{hr}| < \epsilon_r, \left|\frac{d}{dt}R_{vr} - \frac{d}{dt}R_{hr}\right| < \epsilon_v.$$

Note that this coarse match does not require any angle calculation (though angle data may also be used for matching). After this initial match, refined ranges and range rates may be calculated, (e.g., for a given time window, $R_{vl}$ and $R_{hl}$ may be averaged to generate $R_l$), which may then be used to match across the element set (as described for the 1D radar).

S333 includes generating refined tracking parameters from the matched coarse tracking parameters. After coarse parameters have been matched across element sets, S333 functions to combine the coarse parameters to produced refined ones. For example, $\theta_i^*$ and $\theta_i$ may be averaged for each time window to produce a refined angle. Additionally or alternatively, refined tracking parameters may be generated in any manner. For example, the data may be transformed in another manner (aside from a simple average), for example, $\sin \theta_i$ and $\sin \theta_i^*$ may be averaged to generate $\sin \theta$. As another example, $\theta_i^*$ may be used to filter out noisy measurements—for example, a time averaged value of $\theta$ may be calculated where the weight of each sample is determined by the discrepancy between $\theta_i$ and $\theta_i^*$.

Doppler Enhancement

S331-S333 provide ways to calculate azimuth, elevation, or other angles from a single or multi-dimensional radar array using phase data. S330 may additionally or alternatively include using Doppler frequency shift data and velocity data to enhance position calculation. Using these two data sources, the composite angle may be calculated (without use of elevation or azimuth).

For a one-dimensional radar array, the composite angle may be used, along with the elevation and range, to produce a tracking solution. Note that this example implementation both expands the dimensionality of the radar array (producing three-dimensional data instead of two-dimensional data from the one-dimensional array), and also provides for increased accuracy over a traditional two-dimensional radar array (because the angular resolution of the Doppler-generated composite angle is often higher than the angular resolution of elevation and azimuth generated by traditional solutions).

In a second example implementation of the method 300, S330 includes calculating elevation and azimuth (though this angle may be any two perpendicular angles in a plane perpendicular to a receiver array) using phase or time difference information and calculating composite angle using Doppler frequency shift data and velocity data. This example implementation is preferably used with a two-dimensional radar array (which, using traditional techniques, is capable of determining both elevation and azimuth), but may additionally or alternatively be used with any radar system. In this example implementation, the composite angle may be used, along with the elevation, azimuth and range, to produce a tracking solution. In this example, the composite angle may be used as a constraint or filter to improve the accuracy of elevation and azimuth estimates, thus greatly improving the accuracy of the data produced.

While simply using Doppler-derived angles already provides substantial improvement to traditional techniques, S330 may include multiple techniques for providing additional improvement. Such techniques are as described in U.S. patent application Ser. No. 15/676,018.

S340 includes refining the initial tracking parameters. S340 functions to generate a more accurate tracking solution than that initially calculated by S330. In a first example implementation, S340 includes running a Kalman filter on Cartesian coordinates of a target generated from elevation angle or azimuth angle (determined from phase information), range, and composite angle (determined from Doppler shift), constrained by error bounds of the composite angle. In a second example implementation, S340 includes running a Kalman filter on Cartesian coordinates of a target generated from elevation angle and azimuth angle (determined from phase information), range, and composite angle (determined from Doppler shift), constrained by error bounds of the composite angle.

S340 may additionally or alternatively include filtering, refining, and/or constraining tracking parameters in any manner.

The methods of the preferred embodiment and variations thereof can be embodied and/or implemented at least in part as a machine configured to receive a computer-readable medium storing computer-readable instruction. The instructions are preferably executed by computer-executable components preferably integrated with a system for stereo radar tracking. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for coherent stereo radar tracking comprises:
at a radar system, having a first radar array, the first radar array comprising a first set of radar elements having a first intraset spacing and a second set of radar elements having a second intraset spacing, transmitting a probe signal; wherein the first and second sets of radar elements are positioned on a first radar axis and are separated by an interset spacing larger than the first and second intraset spacings;
at the radar system, receiving a reflected probe signal in response to reflection of the probe signal by a tracking target, wherein the tracking target and radar system are connected by a target vector;
calculating a first target range from reflected probe signal data received at the first set of radar elements during a first time period;
calculating a second target range from reflected probe signal data received at the second set of radar elements during the first time period;
transforming the reflected probe signal data received by the second set of radar elements based upon the first and second target ranges and the interset spacing of the first radar array; and
calculating a first target angle between a first reference vector and a first projected target vector from the reflected probe signal data received at the first set of radar elements and from the transformed reflected probe signal data received at the second set of radar elements.

2. The method of claim 1, wherein calculating the first target angle comprises calculating one of elevation and azimuth.

3. The method of claim 1, wherein calculating the first target angle comprises calculating the first target angle from phase differences in the reflected probe signal as received by the first and second sets of radar elements.

4. The method of claim 3, wherein calculating the first target angle comprises calculating the first target angle based on an assumption that each element of the first set of radar elements is at a first angle-to-target and that each element of second set of radar elements is at a second angle-to-target; wherein the first and second angles-to-target are not equal.

5. The method of claim 4, wherein the reflected probe signal data received at the first set of radar elements and the transformed reflected probe signal data received at the second set of radar elements are processed jointly and coherently to calculate the first target angle.

6. The method of claim 5, wherein calculating the first target angle comprises performing a Fourier transform on the reflected probe signal data received at the first set of radar elements and the transformed reflected probe signal data received at the second set of radar elements.

7. The method of claim 6, wherein the Fourier transform is an FFT (Fast Fourier Transform) and calculating the first target angle further comprises zero-padding between the reflected probe signal data received at the first set of radar elements and the transformed reflected probe signal data received at the second set of radar elements.

8. The method of claim 7, wherein calculating the first target angle comprises performing the FFT without first performing beamforming on the reflected probe signal data.

9. The method of claim 3, wherein transforming the reflected probe signal data received by the second set of radar elements comprises pre-calculating angle-range relationships using the interset spacing and using the pre-calculated angle-range relationships to transform the reflected probe signal data.

10. The method of claim 3, further comprising calculating a target composite angle from the reflected probe signal; wherein the target composite angle is an angle between the target vector and a composite reference vector; and calculating a three-dimensional position of the tracking target relative to the radar system from the target range, first target angle, and target composite angle.

11. The method of claim 10, further comprising receiving egovelocity data; wherein calculating the target composite angle comprises calculating Doppler frequency shift data from the probe signal and reflected probe signal; wherein calculating the target composite angle further comprises calculating the target composite angle from the egovelocity data and the Doppler frequency shift data.

12. The method of claim 11, further comprising determining that the tracking target is stationary and calculating relative target velocity based on egovelocity.

13. A method for coherent stereo radar tracking comprises:
   at a radar system, having a first radar array and a second radar array, transmitting a probe signal; wherein the first radar array comprises a first set of radar elements having a first intraset spacing and a second set of radar elements having a second intraset spacing, wherein the first and second sets of radar elements are positioned on a first radar axis and are separated by an interset spacing larger than the first and second intraset spacings; wherein the second radar array comprises a third set of radar elements having a third intraset spacing positioned on a second radar axis not parallel to the first radar axis;
   at the radar system, receiving a reflected probe signal in response to reflection of the probe signal by a tracking target, wherein the tracking target and radar system are connected by a target vector;
   calculating a first target range from reflected probe signal data received at the first set of radar elements during a first time period;
   calculating a second target range from reflected probe signal data received at the second set of radar elements during the first time period;
   transforming the reflected probe signal data received by the second set of radar elements based upon the first and second target ranges and the interset spacing of the first radar array;
   calculating a first target angle between a first reference vector and a first projected target vector from the reflected probe signal data received at the first set of radar elements and from the transformed reflected probe signal data received at the second set of radar elements;
   calculating a second target angle between a second reference vector and a second projected target vector from the reflected probe signal; wherein the second projected target vector is the target vector projected into a second reference plane, the second reference plane containing both of the second radar axis and the second reference vector; and
   calculating a three-dimensional position of the tracking target relative to the radar array from the first target range, first target angle, and second target angle.

14. The method of claim 13, wherein calculating the first target angle comprises calculating elevation and calculating the second target angle comprises calculating azimuth.

15. The method of claim 13, wherein calculating the first target angle comprises calculating azimuth and calculating the second target angle comprises calculating elevation.

16. The method of claim 13, wherein calculating the first target angle comprises calculating the first target angle from phase differences in the reflected probe signal as received by the first and second sets of radar elements; wherein calculating the second target angle comprises calculating the second target angle from phase differences in the reflected probe signal as received by the third set of radar elements.

17. The method of claim 16, wherein calculating the first target angle comprises calculating the first target angle based on an assumption that each element of the first set of radar elements is at a first angle-to-target and that each element of second set of radar elements is at a second angle-to-target; wherein the first and second angles-to-target are not equal.

18. The method of claim 17, wherein the reflected probe signal data received at the first set of radar elements and the transformed reflected probe signal data received at the second set of radar elements are processed jointly and coherently to calculate the first target angle.

19. The method of claim 18, wherein calculating the first target angle comprises performing a Fourier transform on the reflected probe signal data received at the first set of radar elements and the transformed reflected probe signal data received at the second set of radar elements; wherein calculating the second target angle comprises performing a Fourier transform on the reflected probe signal data received at the third set of radar elements.

20. The method of claim 19, wherein the first and second target angles are calculated simultaneously by performing a Fourier transform on the reflected probe signal data received at the first set of radar elements, the transformed reflected probe signal data received at the second set of radar elements, and the reflected probe signal data received at the third set of radar elements.

21. The method of claim 20, wherein the Fourier transform is an FFT (Fast Fourier Transform) and performing the FFT comprises zero-padding between the reflected probe signal data received at the first set of radar elements and the transformed reflected probe signal data received at the second set of radar elements.

22. The method of claim 21, wherein calculating the first target angle and the second target angle comprises performing the FFT without first performing beamforming on the reflected probe signal data.

23. The method of claim 13, further comprising calculating a target composite angle from the reflected probe signal; wherein the target composite angle is an angle between the target vector and a composite reference vector; wherein calculating the three-dimensional position of the tracking target relative to the radar system comprises calculating the three-dimensional position of the tracking target from the target range, first target angle, second target angle, and target composite angle.

24. The method of claim 23, further comprising receiving egovelocity data; wherein calculating the target composite angle comprises calculating Doppler frequency shift data from the probe signal and reflected probe signal; wherein calculating the target composite angle further comprises calculating the target composite angle from the egovelocity data and the Doppler frequency shift data.

25. The method of claim 24, further comprising determining that the tracking target is stationary and calculating relative target velocity based on egovelocity.

* * * * *